United States Patent
Choi

(10) Patent No.: US 8,213,985 B2
(45) Date of Patent: Jul. 3, 2012

(54) MOBILE COMMUNICATION TERMINAL SUPPORTING TTY DEVICE FOR HARD-OF-HEARING OR SPEECH-DISABLED PERSON AND COMMUNICATION METHOD THEREOF

(75) Inventor: Hye-sung Choi, Gyeonggi-do (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1630 days.

(21) Appl. No.: 11/601,196

(22) Filed: Nov. 16, 2006

(65) Prior Publication Data
US 2007/0202916 A1     Aug. 30, 2007

(30) Foreign Application Priority Data
Feb. 7, 2006 (KR) .................. 10-2006-0011756

(51) Int. Cl.
*H04M 1/00* (2006.01)
(52) U.S. Cl. .............. 455/556.1; 455/557; 455/550.1; 379/52
(58) Field of Classification Search ............ 455/557, 455/550.1, 556.1; 379/52
See application file for complete search history.

(56) References Cited

U.S. PATENT DOCUMENTS

| | | | |
|---|---|---|---|
| 6,351,495 B1 * | 2/2002 | Tarraf | 375/259 |
| 6,983,171 B2 * | 1/2006 | Van Bosch et al. | 455/557 |
| 2003/0196158 A1 * | 10/2003 | Leung | 714/776 |

* cited by examiner

*Primary Examiner* — Vladimir Magloire
(74) *Attorney, Agent, or Firm* — H.C. Park & Associates, PLC

(57) ABSTRACT

A mobile communication terminal supporting a teletypewriter (TTY) device for a hard-of-hearing or speech-disabled user is provided. The mobile communication terminal includes: a controller activating a vocoder corresponding to a TTY mode selected by a user; a vocoder encoding a Baudot tone received from the TTY device into a voice data packet based on the selected TTY mode; a TTY mode processor including TTY mode information selected by a user in part of the voice data packet; and an RF transmitter transmitting an encoded voice data packet including the TTY mode information.

20 Claims, 5 Drawing Sheets

MOBILE COMMUNICATION TERMINAL SUPPORTING TTY DEVICE FOR HARD-OF-HEARING OR SPEECH-DISABLED PERSON AND COMMUNICATION METHOD THEREOF

BACKGROUND OF THE INVENTION

This application claims the priority of Korean Patent Application No. 2006-11756, filed on Feb. 7, 2006, in the Korean Intellectual Property Office, the disclosure of which is incorporated herein in its entirety by reference.

1. Field of the Invention

The present invention relates to a mobile communication terminal and, more particularly, to a mobile communication terminal supporting a teletypewriter (TTY) device for hard-of-hearing or speech-disabled persons.

2. Description of Related Art

A mobile communication terminal provides TTY services to hard-of-hearing or speech-disabled persons. The TTY service receives Baudot tones corresponding to voice or characters from a TTY device, packetizes and transmits the received Baudot tones to a wireless network. Since the mobile communication terminal is connected to the TTY device and supports a vocoder (voice coder) corresponding to the TTY device, a TTY mode needs to be set in the mobile communication terminal.

In more detail, the TTY device is an industrial standard device that transfers a Baudot tone of 45.45 bps and is connected to the mobile communication terminal through a 2.5 mm audio connector (e.g., headset jack or ear jack). Since the TTY device uses the same audio connecter as an earphone, the mobile communication terminal cannot identify whether or not a device connected to the audio connecter is a TTY device. Thus, a user selects a desired TTY mode and notifies the mobile communication terminal of the selected TTY mode.

There are three TTY modes: 1) a Full mode in which a Baudot tone is sent and received for hard-of-hearing or speech-disabled users; 2) a VCO (voice carryover) mode in which voice is sent and a Baudot tone is received for hard-of-hearing but speaking users; and 3) an HCO (hearing carryover) mode in which a Baudot tone is sent and voice is received for speech-disabled but hearing users. The TTY modes, such as Full-to-Full, VCO-to-HCO, or HCO-to-VCO, of mobile communication terminals need to be preset on both transmitter and receiver sides. That is, both of the terminals need to be connected to the TTY devices and TTY modes need to be preset in the terminals.

However, as described above, since the mobile communication terminal cannot identify whether or not a device connected to the audio connecter is a TTY device, a mobile communication terminal on the receiver side cannot determine whether a received voice data packet is voice or Baudot tone. That is, if both of the transmitter and receiver sides do not notify each other beforehand which TTY mode has been preset in the terminals, the receiver side cannot identify whether or not a TTY mode on the transmitter side is in an enable state, or which TTY mode is in an enable state. As a result, there is a problem in that when the transmitter side unilaterally attempts to make a call, the receiver side may conclude the transmitter's terminal or base station to be defective due to an incorrect TTY mode.

SUMMARY OF THE INVENTION

The present invention provides a mobile communication terminal supporting a teletypewriter (TTY) device for hard-of-hearing or speech-disabled persons, and a communication method thereof.

According to an aspect of the present invention, there is provided a mobile communication terminal supporting a TTY device for a hard-of-hearing or speech-disabled user, including: a controller activating a vocoder corresponding to a TTY mode selected by a user; a vocoder encoding a Baudot tone received from the TTY device into a voice data packet based on the selected TTY mode; a TTY mode processor including TTY mode information selected by a user in part of the voice data packet; and an RF transmitter transmitting an encoded voice data packet including the TTY mode information.

According to another aspect of the present invention, there is provided a mobile communication terminal supporting a TTY device for a hard-of-hearing or speech-disabled user, including: an RF receiver receiving an encoded voice data packet including TTY mode information selected by a user; a TTY mode processor extracting the selected TTY mode information from the received voice data packet to determine a TTY mode on a receiver side that corresponds to the TTY mode information; a controller activating a vocoder corresponding to the determined TTY mode on the receiver side; and a vocoder decoding the received voice data packet into a Baudot tone, which can be processed in the TTY device, based on the determined TTY mode.

The selected TTY mode information may be recorded on two bits of a reserved area of the voice data packet.

The selected TTY mode information may be a TTY disable mode in which a TTY function is not used, a TTY VCO mode in which voice is sent and a Baudot tone is received, a TTY HCO mode in which a Baudot tone is sent and voice is received, or a TTY Full mode in which a Baudot tone is sent and received.

The Baudot tone may be transmitted and received through the TTY device and audio path (ear jack).

The mobile communication terminal may further include a user interface allowing the hard-of-hearing or speech-disabled user to select a desired TTY mode.

The mobile communication terminal may further include a display processor displaying the selected TTY mode information or the determined TTY mode information on the receiver side.

According to another aspect of the present invention, there is provided a communication method of a mobile communication terminal supporting a TTY device for a hard-of-hearing or speech-disabled user, including: activating a vocoder corresponding to a TTY mode selected by a user; encoding a Baudot tone received from the TTY device into a voice data packet based on the selected TTY mode; including TTY mode information selected by a user in part of the voice data packet; and transmitting an encoded voice data packet including the TTY mode information.

According to another aspect of the present invention, there is provided a communication method of a mobile communication terminal supporting a TTY device for a hard-of-hearing or speech-disabled user, including: receiving an encoded voice data packet including TTY mode information selected by a user; extracting the TTY mode information from the received voice data packet to determine a TTY mode on a receiver side that corresponds to the TTY mode information; activating a vocoder corresponding to the determined TTY mode; decoding the received voice data packet into a Baudot tone, which can be processed in the TTY device, based on the determined TTY mode; and transmitting the Baudot tone to the TTY device.

The communication method may further include displaying the selected TTY mode information and the determined TTY mode information on a display unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings. In the following description, a detailed description of known functions and configurations incorporated herein will be omitted when it may make the subject matter of the present invention rather unclear.

Figure 1:
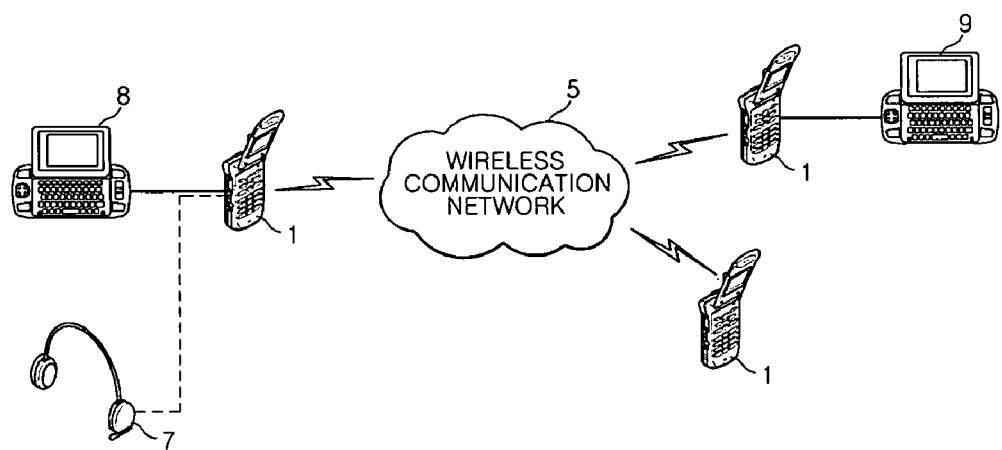
FIG. 1 is a mobile communication terminal that supports a TTY device according to the present invention.

FIG. 1 is a mobile communication terminal supporting a TTY device according to the present invention.

A standard teletypewriter (TTY) device 8 on a transmitter side is connected through an audio connecter to a mobile communication terminal 1 supporting a TTY device according to the present invention, and communicates with a standard TTY device 9 on a receiver side connected through a wireless communication network 5 to a mobile communication terminal 1 supporting a TTY device according to the present invention. The TTY devices 8 and 9 transmit voice or Baudot tone to the mobile communication terminals based on setup modes, and the mobile communication terminals make communications with each other. That is, the mobile communication terminal 1 activates a vocoder corresponding to the setup mode to encode or decode voice or Baudot tones.

Figure 2:
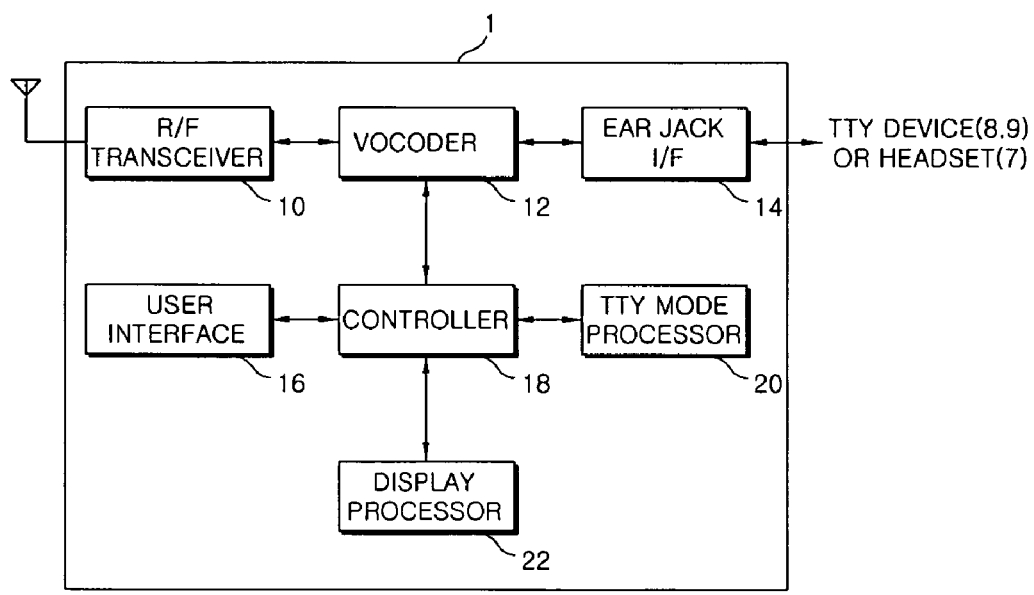
FIG. 2 is a block diagram of a mobile communication terminal that supports a TTY device according to the present invention.

FIG. 2 is a block diagram of a mobile communication terminal supporting a TTY device according to the present invention.

The mobile communication terminal 1 includes an R/F transceiver 10, a vocoder 12, an ear jack interface 14, a user interface 16, a controller 18, a TTY mode processor 20, and a display processor 22. The R/F transceiver 10 transmits or receives voice data packets over the wireless communication network 5. The vocoder 5 encodes voice or Baudot tones to voice data packets, or decodes voice data packets to voice or Baudot tones. Different vocoders are preferably used according to whether encoded or decoded data is voice or Baudot tones. The ear jack interface 14 is an audio connecter interface for connection with a standard TTY device. The user interface 16 allows a user to select a desired TTY mode. The controller 18 activates a vocoder corresponding to the selected TTY mode. That is, the controller 18 activates a vocoder for voice processing when the TTY mode is set for voice processing, and activates a vocoder for Baudot tone processing when the TTY mode is set for Baudot tone processing. The TTY mode processor 20 adds TTY mode information selected by the user in a part of voice data packet, and extracts TTY mode information from a received voice data packet to determine a TTY mode on a receiver side based on the TTY mode information selected by a transmitter side. The display processor 22 displays the TTY mode information determined by the TTY mode processor 20 on a display unit. The TTY mode information may be displayed on a desktop or pop-up window of the mobile communication terminal 1.

The operation of mobile communication terminals on both transmitter and receiver sides will be described. The mobile communication terminal 1 on the transmitter side receives TTY mode information suited for hard-of-hearing or speech-disabled users through the user interface 16. The controller 18 activates a vocoder for voice or Baudot tone according to the selected TTY mode. The activated vocoder 12 encodes a Baudot tone or voice received from the TTY device into a voice data packet based on the selected TTY mode under the control of the controller 18. The TTY processor 20 adds the TTY mode information selected by the user to part of the voice data packet to inform the receiver side of the TTY information on the transmitter side. The RF transceiver 10 transmits the encoded voice data packet including the TTY mode information through the wireless communication network 5.

The mobile communication terminal 1 on the receiver side receives through the RF transceiver 10 the encoded voice data packet including the TTY mode information selected by the user. The TTY processor 20 extracts the TTY mode information from the received voice data packet to determine a corresponding TTY mode on the receiver side. The display processor 22 may display the TTY mode information, which is selected on the transmitter side or determined on the receiver side, on a desktop or pop-up window. The controller 18 activates a vocoder corresponding to the determined TTY mode information, and the activated vocoder 12 decodes the received voice data packet into voice or Baudot tone based on the determined TTY mode. The converted voice or Baudot tone is output through the TTY device 9.

Figure 3:
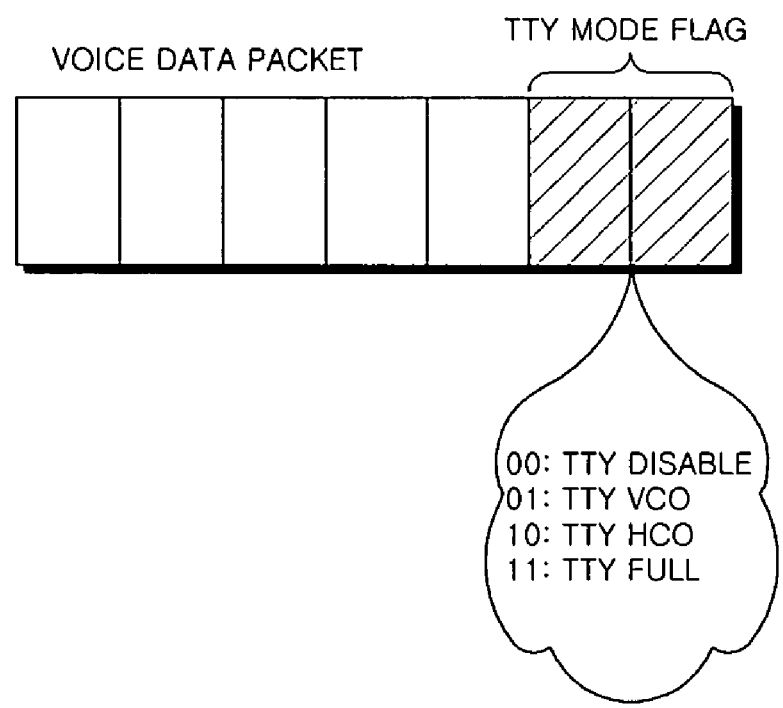
FIG. 3 is a voice data packet having TTY mode information.

FIG. 3 is a voice data packet including TTY mode information.

TTY mode information selected by a user is added to part of a reserved area that is not used in an encoded voice data packet. Since there are four TTY modes, only two bits of the reserved area are required to contain the TTY mode information. A TTY Disable mode is denoted by '00', which indicates that a TTY function is not used. A TTY VCO mode is denoted by '01', which indicates that voice is sent and a Baudot tone is received. A TTY HCO mode is denoted by '10', which indicates that a Baudot tone is sent and voice is received. A TTY Full mode is denoted by '11', which indicates that a Baudot tone is sent and received. It should be understood that the respective TTY modes may be configured to have different setup values from the above.

Figure 4:
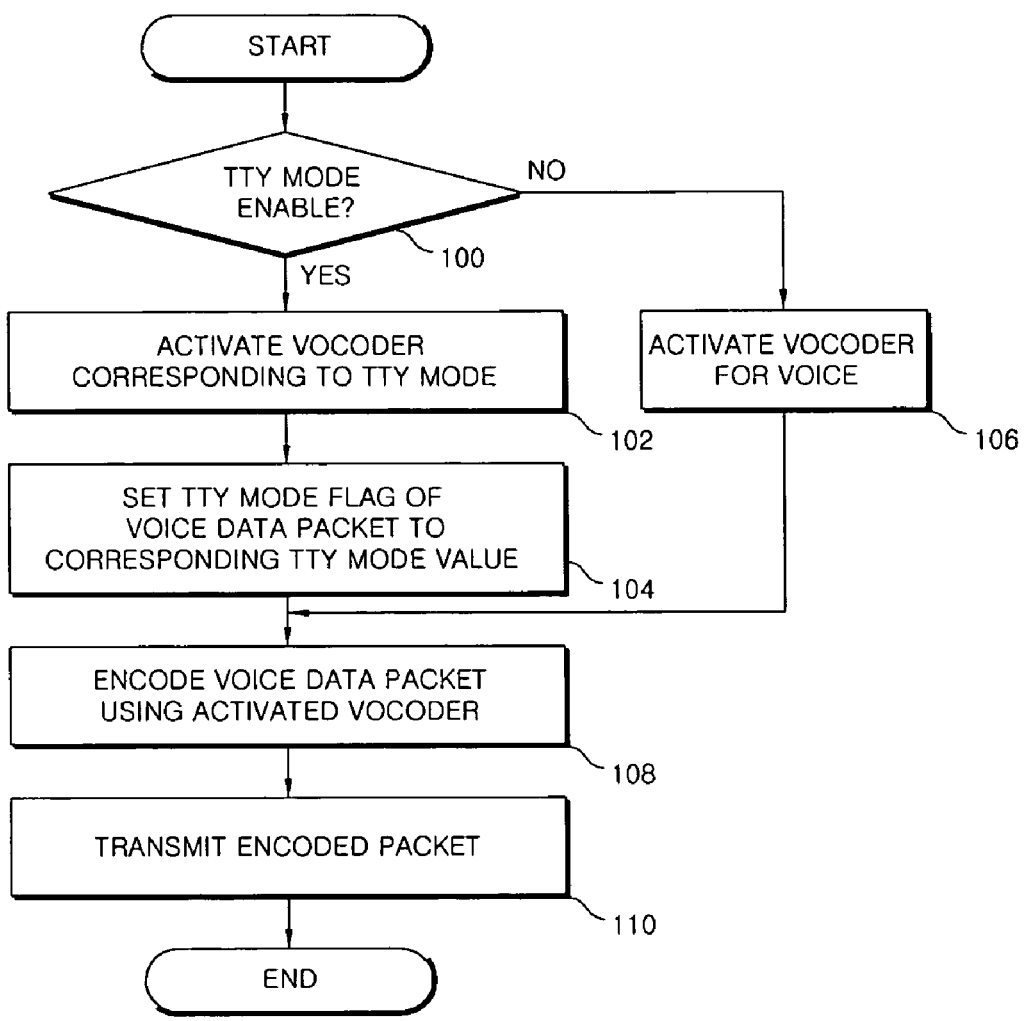
FIG. 4 is a flow chart of a communication method of a mobile communication terminal on a transmitter side according to an embodiment of the present invention.

FIG. 4 is a flow chart of a communication method of a mobile communication terminal on a transmitter side according to an embodiment of the present invention.

When a TTY mode selected through a user interface is a TTY disable mode (operation 100), a vocoder for voice is activated (operation 106). When the selected mode is not the TTY disable mode, a vocoder for Baudot tone is activated (operation 102). A corresponding TTY mode value is set to a predetermined flag of a reserved area of a voice data packet (operation 104). The voice data packet is encoded by a vocoder activated based on the corresponding TTY mode (operation 108). The encoded voice data packet is transmitted through the RF transmitter (operation 110).

Figure 5:
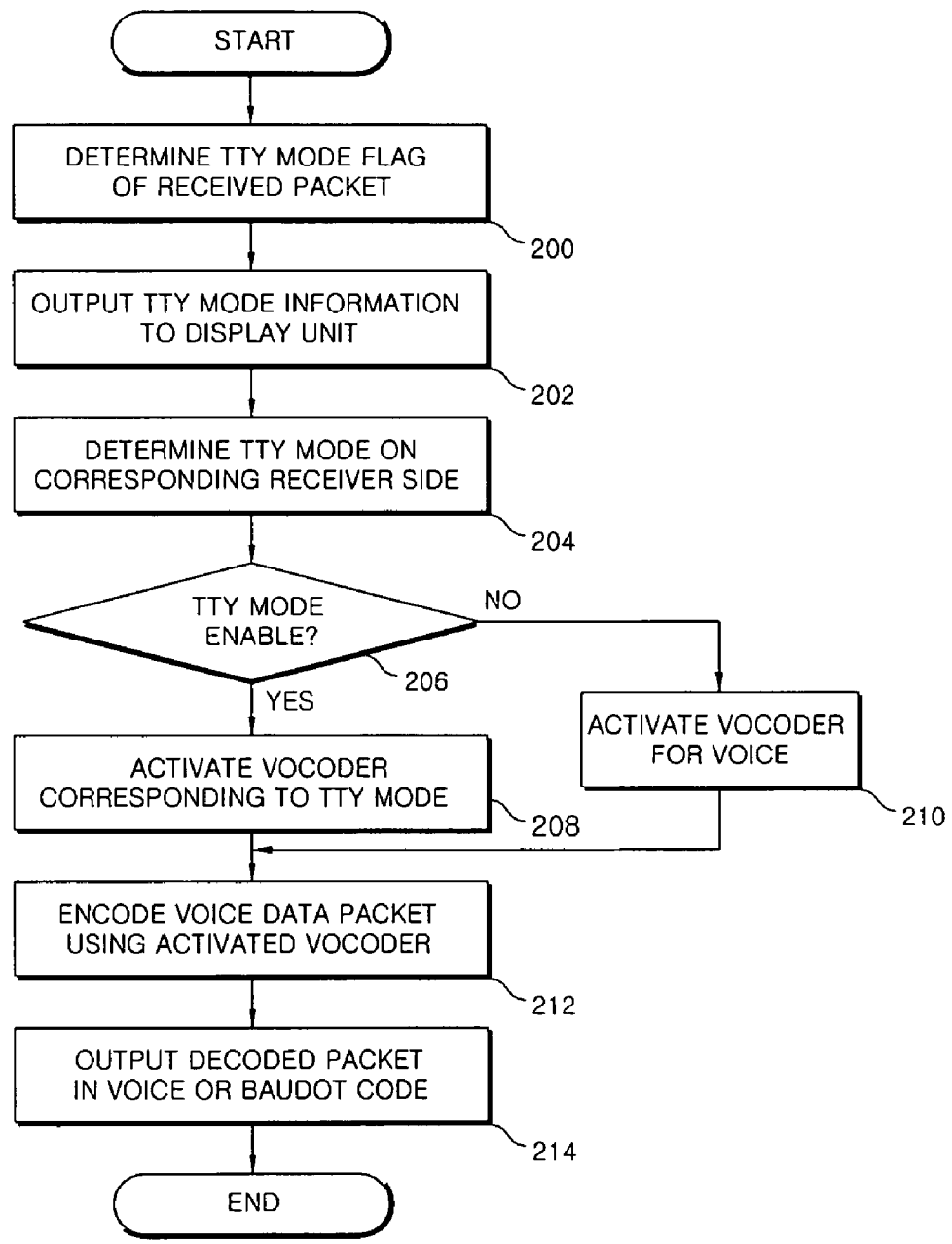
FIG. 5 is a flow chart of a communication method of a mobile communication terminal on a receiver side according to an embodiment of the present invention.

FIG. 5 is a flow chart of a communication method of a mobile communication terminal on a receiver side according to an embodiment of the present invention.

A TTY mode value is extracted from voice data received through the RF receiver (operation 200). The extracted TTY mode value on a transmitter side is displayed on a display unit (operation S202). A TTY mode on a receiver side is determined based on the TTY mode value (operation 204). A vocoder for voice is activated when the determined TTY mode is a TTY disable mode (operation 210), and a vocoder for Baudot tone corresponding to each TTY mode is activated when the determined TTY mode is not the TTY disable mode (operation 208). The voice data packet is decoded into voice or Baudot tone by the activated vocoder (operation 212). The voice or Baudot tone is output (operation 214).

Meanwhile, the communication method of a mobile communication terminal supporting a TTY device according to the present invention may be written in a computer program. Codes and code segments configuring the program can be easily deduced by computer programmers in the art. In addition, the program is stored in computer readable media and executed by computers to carry out the communication method of the mobile communication terminal supporting the TTY device. Examples of the computer readable media include magnetic recording media, optical recording media, and carrier wave media.

As apparent from the above description, TTY mode information selected by a user on a transmitter side is set as a flag in a reserve area of a voice data packet, such that a receiver side identifies the TTY mode information on the transmitter side and determines a TTY mode on the receiver side corresponding to the TTY mode information to activate a corresponding vocoder.

Accordingly, the mobile communication terminal supporting the TTY device can set the environment on the receiver side according to the TTY mode information on the transmitter side so as to efficiently support TTY functions.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal supporting a teletypewriter (TTY) device for a hard-of-hearing or speech-disabled user, comprising:
    a controller activating a vocoder corresponding to a TTY mode selected by a user;
    a vocoder encoding a Baudot tone received from the TTY device into a voice data packet based on the selected TTY mode;
    a TTY mode processor including TTY mode information selected by a user in part of the voice data packet; and
    an RF transmitter transmitting an encoded voice data packet including the TTY mode information.

2. A mobile communication terminal supporting a TTY device for a hard-of-hearing or speech-disabled user, comprising:
    an RF receiver receiving an encoded voice data packet including TTY mode information selected by a user;
    a TTY mode processor extracting the selected TTY mode information from the received voice data packet to determine a TTY mode on a receiver side that corresponds to the TTY mode information;
    a controller activating a vocoder corresponding to the determined TTY mode on the receiver side; and
    a vocoder decoding the received voice data packet into a Baudot tone, which can be processed in the TTY device, based on the determined TTY mode.

3. The mobile communication terminal of claim 1, wherein the selected TTY mode information is recorded on two bits of a reserved area of the voice data packet.

4. The mobile communication terminal of claim 2, wherein the selected TTY mode information is recorded on two bits of a reserved area of the voice data packet.

5. The mobile communication terminal of claim 1, wherein the selected TTY mode information is a TTY disable mode in which a TTY function is not used, a TTY VCO mode in which voice is sent and a Baudot tone is received, a TTY HCO mode in which a Baudot tone is sent and voice is received, or a TTY Full mode in which a Baudot tone is sent and received.

6. The mobile communication terminal of claim 2, wherein the selected TTY mode information is a TTY disable mode in which a TTY function is not used, a TTY VCO mode in which voice is sent and a Baudot tone is received, a TTY HCO mode in which a Baudot tone is sent and voice is received, or a TTY Full mode in which a Baudot tone is sent and received.

7. The mobile communication terminal of claim 1, wherein the Baudot tone is transmitted and received through the TTY device and audio path (ear jack).

8. The mobile communication terminal of claim 2, wherein the Baudot tone is transmitted and received through the TTY device and audio path (ear jack).

9. The mobile communication terminal of claim 1, further including a user interface allowing the hard-of-hearing or speech-disabled user to select a desired TTY mode.

10. The mobile communication terminal of claim 2, further including a user interface allowing the hard-of-hearing or speech-disabled user to select a desired TTY mode.

11. The mobile communication terminal of claim 1, further including a display processor displaying the selected TTY mode information or the determined TTY mode information on the receiver side.

12. The mobile communication terminal of claim 2, further including a display processor displaying the selected TTY mode information or the determined TTY mode information on the receiver side.

13. A communication method of a mobile communication terminal supporting a TTY device for a hard-of-hearing or speech-disabled user, comprising:
    activating a vocoder corresponding to a TTY mode selected by a user;
    encoding a Baudot tone received from the TTY device into a voice data packet based on the selected TTY mode;
    including TTY mode information selected by a user in part of the voice data packet; and
    transmitting an encoded voice data packet including the TTY mode information.

14. A communication method of a mobile communication terminal supporting a TTY device for a hard-of-hearing or speech-disabled user, comprising:
    receiving an encoded voice data packet including TTY mode information selected by a user;
    extracting the TTY mode information from the received voice data packet to determine a TTY mode on a receiver side that corresponds to the TTY mode information;
    activating a vocoder corresponding to the determined TTY mode;
    decoding the received voice data packet into a Baudot tone, which can be processed in the TTY device, based on the determined TTY mode; and
    transmitting the Baudot tone to the TTY device.

15. The communication method of claim 13, further including displaying the selected TTY mode information and the determined TTY mode information on a display unit.

16. The communication method of claim 14, further including displaying the selected TTY mode information and the determined TTY mode information on a display unit.

17. The communication method of claim 13, wherein the selected TTY mode information is recorded on two bits of a reserved area of the voice data packet.

18. The communication method of claim 14, wherein the selected TTY mode information is recorded on two bits of a reserved area of the voice data packet.

19. The communication method of claim 13, wherein the selected TTY mode information is a TTY disable mode in which a TTY function is not used, a TTY VCO mode in which voice is sent and a Baudot tone is received, a TTY HCO mode in which a Baudot tone is sent and voice is received, or a TTY Full mode in which a Baudot tone is sent and received.

20. The communication method of claim 14, wherein the selected TTY mode information is a TTY disable mode in which a TTY function is not used, a TTY VCO mode in which voice is sent and a Baudot tone is received, a TTY HCO mode in which a Baudot tone is sent and voice is received, or a TTY Full mode in which a Baudot tone is sent and received.

* * * * *